(12) United States Patent
Fu et al.

(10) Patent No.: US 11,853,471 B2
(45) Date of Patent: Dec. 26, 2023

(54) METHOD AND APPARATUS FOR CONTROLLING IMAGE ACQUISITION DEVICE

(71) Applicant: BEIJING 7INVENSUN TECHNOLOGY CO., LTD., Beijing (CN)

(72) Inventors: Yang Fu, Beijing (CN); Yunfei Wang, Beijing (CN); Tongbing Huang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 388 days.

(21) Appl. No.: 17/266,636

(22) PCT Filed: May 8, 2019

(86) PCT No.: PCT/CN2019/085961
§ 371 (c)(1),
(2) Date: Feb. 8, 2021

(87) PCT Pub. No.: WO2020/034669
PCT Pub. Date: Feb. 20, 2020

(65) Prior Publication Data
US 2021/0357637 A1    Nov. 18, 2021

(30) Foreign Application Priority Data
Aug. 16, 2018    (CN) .......................... 201810935421.1

(51) Int. Cl.
*G06T 7/70*    (2017.01)
*G06F 3/01*    (2006.01)
(Continued)

(52) U.S. Cl.
CPC ................ *G06F 3/013* (2013.01); *G06T 7/70* (2017.01); *G06V 10/147* (2022.01); *G06V 10/94* (2022.01);
(Continued)

(58) Field of Classification Search
CPC ......... G06F 3/013; G06T 7/70; G06V 10/147; G06V 10/94; G06V 30/144; G06V 40/18;
(Continued)

(56) References Cited

U.S. PATENT DOCUMENTS 6,714,665 B1    3/2004 Hanna et al.
2010/0283857 A1    11/2010 Gopinath
(Continued)

FOREIGN PATENT DOCUMENTS

CN    101572804 A    11/2009
CN    101632090 A    1/2010
(Continued)

OTHER PUBLICATIONS

Office action of corresponding JP application No. 2021-507975.
Partial supplementary European search report of corresponding EP application No. 19850614.9.

*Primary Examiner* — Stephen P Coleman
(74) *Attorney, Agent, or Firm* — Gang Yu (57) ABSTRACT

A method and apparatus for controlling an image acquisition device are provided. The method includes that: multiple images photographed by multiple image acquisition devices are acquired; an active image acquisition device and an inactive image acquisition device in the multiple image acquisition devices are determined according to the multiple images; the active image acquisition device is controlled to photograph a first image by using a first configuration, and the inactive image acquisition device is controlled to photograph a second image by using a second configuration; the
(Continued)

first image transmitted by the active image acquisition device is acquired, and the second image transmitted by the inactive image acquisition device is acquired, and a bandwidth required by the active image acquisition device to transmit the first image is greater than a bandwidth required by the inactive image acquisition device to transmit the second image.

10 Claims, 2 Drawing Sheets

(51) Int. Cl.
   *G06V 40/18* (2022.01)
   *H04N 23/667* (2023.01)
   *G06V 30/144* (2022.01)
   *G06V 10/147* (2022.01)
   *G06V 10/94* (2022.01)
   *G06V 40/19* (2022.01)
   *H04N 23/90* (2023.01)
   *G06V 10/10* (2022.01)

(52) U.S. Cl.
   CPC ............ *G06V 30/144* (2022.01); *G06V 40/18* (2022.01); *G06V 40/19* (2022.01); *H04N 23/667* (2023.01); *G06V 10/16* (2022.01); *H04N 23/90* (2023.01)

(58) Field of Classification Search
   CPC ...... G06V 40/19; G06V 10/16; H04N 23/667; H04N 23/90; H04N 23/662; H04N 23/611
   USPC .......................................................... 382/103
   See application file for complete search history.

(56) References Cited

U.S. PATENT DOCUMENTS

| 2015/0121222 | A1* | 4/2015 | Lacaze | G06F 3/0482 715/717 |
|---|---|---|---|---|
| 2016/0301866 | A1* | 10/2016 | Kim | H04N 23/611 |
| 2017/0227841 | A1 | 8/2017 | Niemela et al. | |

FOREIGN PATENT DOCUMENTS

| CN | 103576857 A | 2/2014 |
|---|---|---|
| CN | 104660998 A | 5/2015 |
| CN | 104869306 A | 8/2015 |
| CN | 106303390 A | 1/2017 |
| CN | 106851249 A | 6/2017 |
| CN | 107203270 A | 9/2017 |
| CN | 109120847 A | 1/2019 |
| JP | 2017010120 A | 1/2017 |
| JP | 2017536565 A | 12/2017 |
| WO | 2014061181 A1 | 4/2014 |

\* cited by examiner

METHOD AND APPARATUS FOR CONTROLLING IMAGE ACQUISITION DEVICE

TECHNICAL FIELD

The present disclosure relates to the technical field of eye-tracking, and in particularly to a method and apparatus for controlling an image acquisition device.

BACKGROUND

An eye-tracking technology is a technology for obtaining a gaze point of a target object by analyzing eye movements of the target object. The mainstream technology mainly relies on eye images based on infrared frequency bands to analyze eye feature information, thereby obtaining the gaze point of the target object.

At present, in a telemetry eye-tracking technology, multiple image acquisition devices are adopted to photograph images of the target object, and the images photographed by the multiple image acquisition devices are transmitted to a controller, such that the controller analyzes the eye feature information based on the photographed images of the target object to obtain the gaze point of the target object.

However, an operation of transmitting the images photographed by the multiple image acquisition devices to the controller requires a large transmission bandwidth. The transmission bandwidth is limited by a specific transmission protocol to result in that an actual bandwidth cannot meet the requirement on the bandwidth for transmitting the images photographed by the multiple image, acquisition devices.

SUMMARY

At least some embodiments of the present disclosure provide a method and apparatus for controlling an image acquisition device, so as at least partially to solve a problem that transmitting images photographed by multiple image acquisition devices to a controller at the same time results in that an actual bandwidth cannot meet a requirement on the bandwidth for transmitting the images photographed by the multiple image acquisition devices.

In an embodiment of the present disclosure, a method for controlling an image acquisition device is provided, which may include the following operations.

Multiple images photographed by multiple image acquisition devices are acquired.

An active image acquisition device and an inactive image acquisition device in the multiple image acquisition devices are determined according to the multiple images.

The active image acquisition device is controlled to photograph a first image by using a first configuration, and the inactive image acquisition device is controlled to photograph a second image by using a second configuration.

The first image transmitted by the active image acquisition device is acquired, and the second image transmitted by the inactive image acquisition device is acquired.

A bandwidth required by the active image acquisition device to transmit the first image is greater than a bandwidth required by the inactive image acquisition device to transmit the second image.

In an optional embodiment, the operation that the active image acquisition device and the inactive image acquisition device in the multiple image acquisition devices are determined according to the multiple images may include the following operations.

A position of a target object is acquired according to the multiple images.

The active image acquisition device and the inactive image acquisition device are determined according to relative positions between each of the multiple image acquisition devices and the target object.

In an optional embodiment, the operation that the active image acquisition device and the inactive image acquisition device in the multiple image acquisition devices are determined according to the multiple images may include the following operations.

An image acquisition device without containing the target object in the multiple images is determined as the inactive image acquisition device.

The active image acquisition device is determined from image acquisition devices to be selected, the image acquisition devices to be selected being remaining image acquisition devices except for the inactive image acquisition device in the multiple image acquisition devices.

In an optional embodiment, the operation that the active image acquisition device is controlled to photograph the first image by using the first configuration, and the inactive image acquisition device is controlled to photograph the second image by using the second configuration may include at least one of the followings.

The active image acquisition device is controlled to photograph the first image by using a first frequency, and the inactive image acquisition device is controlled to photograph the second image by using a second frequency, the first frequency being greater than the second frequency.

The active image acquisition device is controlled to photograph the first image by using a first image bit width, and the inactive image acquisition device is controlled to photograph the second image by using a second image bit width, the first image bit width being greater than the second image bit width.

The active image acquisition device is controlled to photograph the first image by using a first resolution, and the inactive image acquisition device is controlled to photograph the second image by using a second resolution, the first resolution being greater than the second resolution.

In an optional embodiment, the operation that the first image transmitted by the active image acquisition device is acquired, and the second image transmitted by the inactive image acquisition device is acquired may include the following operations.

The first image compressed by the active image acquisition device at a first compression ratio and transmitted by the active image acquisition device is acquired, and the second image compressed by the active image acquisition device at a second compression ratio and transmitted by the inactive image acquisition device is acquired, the first compression ratio being smaller than the second compression ratio.

In an optional embodiment, the method may further include the following operation.

At least one of the first frequency and the second frequency is adjusted according to the relative positions between each of the multiple image acquisition devices and the target object.

In an optional embodiment, the method may further include the following operation.

At least one of the first frequency and the second frequency is adjusted according to a definition of the first image.

In an optional embodiment, the method may further include the following operations.

A distance change trend between the target object and the active image acquisition device is determined according to features of multiple frames of images continuously photographed by the active image acquisition device.

A probability of switching the active image acquisition device to the inactive image acquisition device is determined according to the distance change trend.

When the probability is greater than or equal to a preset threshold, a frequency at which the inactive image acquisition device photographs the second image is accelerated.

In an optional embodiment, the multiple image acquisition devices include a first image acquisition device and a second image acquisition device.

The operation that the position of the target object is acquired according to the multiple images may include at least one of the followings.

A third image containing the target object photographed by the first image acquisition device is acquired, and a distance between the target object and the first image acquisition device is determined according to features of the third image.

A fourth image containing the target object photographed by the second image acquisition device is acquired, and a distance between the target object and the second image acquisition device is determined according to features of the fourth image.

In an optional embodiment, the operation that the active image acquisition device and the inactive image acquisition device are determined according to the relative positions between each of the multiple image acquisition devices and the target object may include at least one of the followings.

When the distance between the target object and the first image acquisition device is located in a first distance interval, the first image acquisition device is determined as the active image acquisition device, and the second image acquisition device is determined as the inactive image acquisition device, the first distance interval being determined according to a focusing position of the first image acquisition device.

When the distance between the target object and the first image acquisition device is located in a second distance interval, the first image acquisition device is determined as the inactive image acquisition device, and the second image acquisition device is determined as the active image acquisition device, the second distance interval being determined according to a focusing position of the second image acquisition device.

In an optional embodiment, a distance between any two image acquisition devices in the multiple image acquisition devices is smaller than a preset distance threshold; and the multiple image acquisition devices at least include two image acquisition devices with different focusing positions.

In another embodiment of the present disclosure, an apparatus for controlling an image acquisition device is further provided, which may include a first acquisition element, a first determination element, a control element and a second acquisition element.

The first acquisition element is configured to acquire multiple images photographed by multiple image acquisition devices.

The first determination element is configured to determine an active image acquisition device and an inactive image acquisition device in the multiple image acquisition devices according to the multiple images.

The control element is configured to control the active image acquisition device to photograph a first image by using a first configuration, and control the inactive image acquisition device to photograph a second image by using a second configuration.

The second acquisition element is configured to acquire the first image transmitted by the active image acquisition device, and acquire the second image transmitted by the inactive image acquisition device.

A bandwidth required by the active image acquisition device to transmit the first image is greater than a bandwidth required by the inactive image acquisition device to transmit the second image.

In an optional embodiment, the first determination element is configured to:

acquire a position of a target object according to the multiple images; and determine the active image acquisition device and the inactive image acquisition device according to relative positions between each of the multiple image acquisition devices and the target object.

In an optional embodiment, the first determination element is configured to:

determine an image acquisition device without containing the target object in the multiple images as the inactive image acquisition device; and determine the active image acquisition device from image acquisition devices to be selected, the image acquisition devices to be selected being remaining image acquisition devices except for the inactive image acquisition device in the multiple image acquisition devices.

In an optional embodiment, the control element is configured to:

control the active image acquisition device to photograph the first image by using a first frequency, and control the inactive image acquisition device to photograph the second image by using a second frequency, the first frequency being greater than the second frequency;

control the active image acquisition device to photograph the first image by using a first image bit width, and control the inactive image acquisition device to photograph the second image by using a second image bit width, the first image bit width being greater than the second image bit width; and control the active image acquisition device to photograph the first image by using a first resolution, and control the inactive image acquisition device to photograph the second image by using a second resolution, the first resolution being greater than the second resolution.

In an optional embodiment, the second acquisition element is configured to:

acquire the first image compressed by the active image acquisition device at a first compression ratio and transmitted by the active image acquisition device, and acquire the second image compressed by the active image acquisition device at a second compression ratio and transmitted by the inactive image acquisition device, the first compression ratio being smaller than the second compression ratio.

In an optional embodiment, the apparatus may further include a first adjustment element.

The first adjustment element is configured to adjust at least one of the first frequency and the second frequency according to the relative positions between each of the multiple image acquisition devices and the target object.

In an optional embodiment, the apparatus may further include a second adjustment element.

The second adjustment element is configured to adjust at least one of the first frequency and the second frequency according to a definition of the first image.

In an optional embodiment, the apparatus may further include a second determination element, a determination element and a frequency acceleration element.

The second determination element is configured to determine a distance change trend between the target object and the active image acquisition device according to features of multiple frames of images continuously photographed by the active image acquisition device.

The determination element is configured to determine, according to the distance change trend, a probability of switching the active image acquisition device to the inactive image acquisition device.

The frequency acceleration element is configured to accelerate, when the probability is greater than or equal to a preset threshold, a frequency at which the inactive image acquisition device photographs the second image.

In an optional embodiment, the multiple image acquisition devices include a first image acquisition device and a second image acquisition device.

The first determination element is further configured to execute at least one of the following operations.

The first determination element acquires a third image containing the target object photographed by the first image acquisition device and determines a distance between the target object and the first image acquisition device according to features of the third image.

The first determination element acquires a fourth image containing the target object photographed by the second image acquisition device and determines a distance between the target object and the second image acquisition device according to features of the fourth image.

In an optional embodiment, the first determination element is further configured to execute at least one of the following operations.

The first determination element determines, when the distance between the target object and the first image acquisition device is located in a first distance interval, the first image acquisition device as the active image acquisition device, and determines the second image acquisition device as the inactive image acquisition device, the first distance interval being determined according to a focusing position of the first image acquisition device.

The first determination element determines, when the distance between the target object and the first image acquisition device is located in a second distance interval, the first image acquisition device as the inactive image acquisition device, and determines the second image acquisition device as the active image acquisition device, the second distance interval being determined according to a focusing position of the second image acquisition device.

In an optional embodiment, a distance between any two image acquisition devices in the multiple image acquisition devices is smaller than a preset distance threshold; and the multiple image acquisition devices at least include two image acquisition devices with different focusing positions.

Compared with the related art, at least some embodiments of the present disclosure have the following advantages.

According to the method for controlling the image acquisition device provided by at least some embodiments of the present disclosure, the multiple images photographed by the multiple image acquisition devices are acquired; the active image acquisition device and the inactive image acquisition device in the multiple image acquisition devices are determined according to the multiple images; the active image acquisition device is controlled to photograph the first image by using the first configuration, and the inactive image acquisition device is controlled to photograph the second image by using the second configuration; and the first image transmitted by the active image acquisition device is acquired, and the second image transmitted by the inactive image acquisition device is acquired, and the bandwidth required by the active image acquisition device to transmit the first image is greater than that required by the inactive image acquisition device to transmit the second image. Therefore, with the utilization of the method for controlling the image acquisition device, the active image acquisition device and the inactive image acquisition device in the multiple image acquisition devices can be determined, the active image acquisition device is controlled to photograph the first image by using the first configuration, and the inactive image acquisition device is controlled to photograph the second image by using the second configuration, such that the bandwidth required by the inactive image acquisition device to transmit the photographed image to the controller is relatively small, and smaller than the bandwidth required by the active image acquisition device to transmit the photographed image to the controller, and not all of the image acquisition devices transmit the images to the controller through larger bandwidths (for example, equal to the bandwidth required by the active image acquisition device to transmit the photographed image to the controller), thereby saving the bandwidth for transmitting the images photographed by the multiple image acquisition devices.

BRIEF DESCRIPTION OF THE DRAWINGS

To illustrate the technical solutions in the embodiments of the present disclosure or in the relevant art more clearly, the accompanying drawings for describing the embodiments or the relevant art are introduced briefly in the following. Apparently, the accompanying drawings in the following description are about some embodiments of the present disclosure, and a person of ordinary skill in the art can derive other drawings from these accompanying drawings without creative efforts.

DETAILED DESCRIPTION

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are only a part of the embodiments of the present disclosure, not all of the embodiments. All other embodiments obtained by a person of ordinary skill in the art based on the embodiments of the application without creative efforts shall fall within the protection scope of the application.

At present, in the telemetry eye-tracking technology, multiple image acquisition devices are controlled to photograph images of the target object at the same photographing frequency and the images photographed by the multiple image acquisition devices are transmitted to a controller, such that the controller analyzes the eye feature information based on the photographed images of the target object to obtain the gaze point of the target object. For the purpose of accurately analyzing the gaze point of the target object, the photographing frequency for the multiple image acquisition devices is generally set to be relatively high.

However, transmitting the images photographed by the multiple image acquisition devices to the controller may require a large transmission bandwidth. The transmission bandwidth is limited by a specific transmission protocol to result in that an actual bandwidth cannot meet the requirement on the bandwidth for transmitting the images photographed by the multiple image acquisition devices.

Besides, in some scenarios, the gaze point of the target object may be accurately analyzed by using images photographed by at least one image acquisition device in the multiple image acquisition devices. In other words, images photographed by the at least one image acquisition device make a little contribution to analysis on the gaze point of the target object. In such a case, frequencies at which the image acquisition devices with the little contribution to the analysis on the gaze point of the target object photograph the images may be reduced, thereby saving the bandwidth for transmitting the images photographed by the multiple image acquisition devices.

In view of this, an embodiment of the present disclosure provides a method and apparatus for controlling an image acquisition device. The method may include the following operations. Multiple images photographed by multiple image acquisition devices are acquired. An active image acquisition device and an inactive image acquisition device in the multiple image acquisition devices are determined according to the multiple images. The active image acquisition device is controlled to photograph a first image by using a first configuration, and the inactive image acquisition device is controlled to photograph a second image by using a second configuration. The first image transmitted by the active image acquisition device is acquired, and the second image transmitted by the inactive image acquisition device is acquired. A bandwidth required by the active image acquisition device to transmit the first image being greater than a bandwidth required by the inactive image acquisition device to transmit the second image.

Therefore, with the utilization of the method for controlling the image acquisition device provided by the embodiment of the present disclosure, the active image acquisition device and the inactive image acquisition device in the multiple image acquisition devices may be determined, the active image acquisition device is controlled to photograph the first image by using the first configuration, and the inactive image acquisition device is controlled to photograph the second image by using the second configuration, such that the bandwidth required by the inactive image acquisition device to transmit the photographed image to the controller is relatively small, and smaller than the bandwidth required by the active image acquisition device to transmit the photographed image to the controller, and not all of the image acquisition devices transmit the images to the controller through larger bandwidths (for example, equal to the bandwidth required by the active image acquisition device to transmit the photographed image to the controller), thereby saving the bandwidth for transmitting the images photographed by the multiple image acquisition devices.

Various unlimited implementation modes of the present disclosure are described below in detail in combination with the accompanying drawings.

Figure 1:
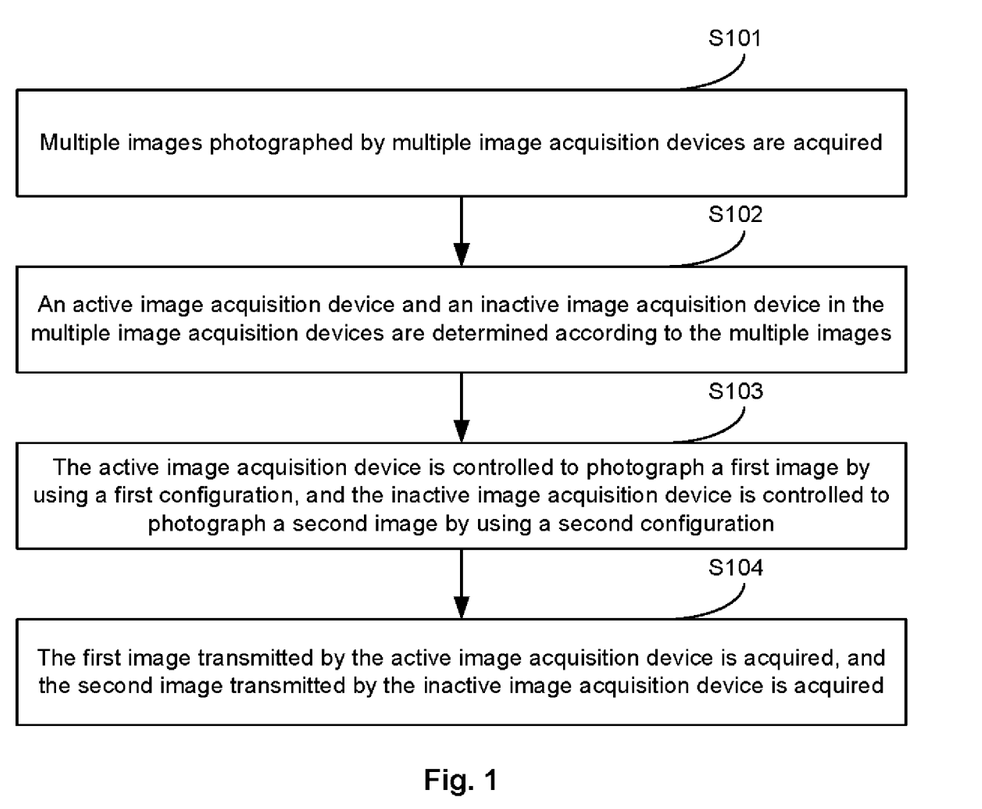
FIG. 1 is a flowchart of a method for controlling an image acquisition device according to an embodiment of the present disclosure.

FIG. 1 is a flowchart of a method for controlling an image acquisition device according to an embodiment of the present disclosure. As shown in FIG. 1, the method may be applied to a telemetry eye-tracking system. The telemetry eye-tracking system may include multiple image acquisition devices and a controller. The image acquisition device may acquire images containing a target object. The controller may analyze eye movements of the target object according to the images containing the target object to obtain a gaze point of the target object.

Specifically, the telemetry eye-tracking system may include multiple image acquisition devices. The multiple image acquisition devices may photograph the same scenario at approximate perspectives. And the multiple image acquisition devices at least include two image acquisition devices with different diagonal positions.

The method for controlling the image acquisition device provided by the embodiment may be implemented through the following steps S101-S104.

In step S101, multiple images photographed by multiple image acquisition devices are acquired.

It is to be noted that a type of each image acquisition device is not specifically limited in the embodiment of the present disclosure, and for example, the image acquisition devices may be cameras.

In the embodiment of the present disclosure, connections between the controller and each of the image acquisition devices may be established by a network. Hence, in an exemplary implementation mode of the embodiment of the present disclosure, the controller may acquire, through the network, the images photographed by the multiple image acquisition devices.

In step S102, an active image acquisition device and an inactive image acquisition device in the multiple image acquisition devices are determined according to the multiple images.

As stated above, in some scenarios, the gaze point of the target object may be accurately analyzed by using images photographed by at least one image acquisition device in the multiple image acquisition devices.

It is to be noted that the active image acquisition device may be interpreted as an image acquisition device making a great contribution to the analysis on the gaze point of the target object. The inactive image acquisition device may be interpreted as an image acquisition device making a little contribution to the analysis on the gaze point of the target object.

It is to be noted that S102 may have a variety of implementation modes during specific implementation in the embodiment of the present disclosure. Hereinafter, two exemplary implementation modes are described.

In a first exemplary implementation mode, the active image acquisition device and the inactive image acquisition device may be determined through the following steps A-B.

In step A, a position of a target object is acquired according to the multiple images.

In the embodiment of the present disclosure, the image acquisition devices in the image acquisition system may be configured to photograph images of the target object, and the image acquisition devices may be cameras etc. After photographing the images, the image acquisition devices may transmit the photographed images to the controller so that the controller may analyze eye movements of the target object according to the images to obtain the gaze point of the target object.

It may be interpreted that because of different distances between the target object and each of the image acquisition devices, features associated with the target object in the images photographed by the image acquisition devices may also be different. Therefore, the position of the target object may be acquired according to the images photographed by the multiple image acquisition devices.

It is to be noted that a distance difference between any two image acquisition devices in the multiple image acquisition devices is not limited in the embodiment of the present disclosure. As an example, the distance difference between any two image acquisition devices in the multiple image acquisition devices is smaller than a preset distance threshold. And the multiple image acquisition devices at least include two image acquisition devices with different focusing positions.

The case where the distance between any two image acquisition devices in the multiple image acquisition devices is smaller than the preset distance threshold may be considered as that when the images containing the target object are photographed, the difference of one distance between the target object and one of the any two image acquisition devices and the other distance between the target object and the other of the any two image acquisition devices is relatively small, i.e., it may be considered as that the distances between any two of the multiple image acquisition devices are very small. That is, it may be roughly considered as that positions where the multiple image acquisition devices are located are the same. For example, in a case where the distance between the target object and the third image acquisition device is a third distance, the distance between the target object and the fourth image acquisition device is a fourth distance, and the difference between the third distance and the fourth distance is relatively small, it may be roughly considered as that the third image acquisition device and the fourth image acquisition device are located at the same positions.

The preset distance threshold is not specifically limited in the present disclosure. As an example, the preset distance threshold may be 10 cm.

Specific values for focal lengths or focusing positions of the multiple image acquisition devices are not specifically limited in the embodiment of the present disclosure.

In step B, the active image acquisition device and the inactive image acquisition device are determined according to relative positions between each of the multiple image acquisition devices and the target object.

In the embodiment of the present disclosure, after the relative positions between each of the multiple image acquisition devices and the target object are acquired, the active image acquisition device and the inactive image acquisition device in the multiple image acquisition devices may be determined according to the relative positions.

In a second exemplary implementation mode, the active image acquisition device and the inactive image acquisition device in the multiple image acquisition devices may be determined through the following manner.

An image acquisition device without containing the target object in the multiple images is determined as the inactive image acquisition device, the active image acquisition device is determined from image acquisition devices to be selected, and the image acquisition devices to be selected are remaining image acquisition devices except for the inactive image acquisition device in the multiple image acquisition devices.

It may be interpreted that the multiple image acquisition devices may have different perspectives. Hence, it is possible that some image acquisition devices cannot photograph images containing the target object. The telemetry eye-tracking technology is to obtain the gaze point of the target object according to eye feature information of the target object. When the images do not contain the target object, the gaze point of the target object cannot be obtained from the images without containing the target object. Therefore, in the embodiment of the present disclosure, the image acquisition device without containing the target object in the photographed images may be determined as the inactive image acquisition device; and then, the active image acquisition device is determined from other image acquisition devices (i.e., the image acquisition devices to be selected) except for the inactive image acquisition device in the multiple image acquisition devices.

It is to be noted that the specific manner for determining the active image acquisition device from the image acquisition devices to be selected is not specifically limited in the embodiment of the present disclosure. As an example, the method in the above steps A-B may be used for determining the active image acquisition device from the image acquisition devices to be selected.

In step S103, the active image acquisition device is controlled to photograph a first image by using a first configuration, and the inactive image acquisition device is controlled to photograph a second image by using a second configuration.

In step S104, the first image transmitted by the active image acquisition device is acquired, and the second image transmitted by the inactive image acquisition device is acquired.

Concerning steps S103 and S104, it is to be noted that the first configuration and the second configuration are not specifically limited in the embodiment of the present disclosure, and specific settings of the first configuration and the second configuration may be determined according to actual conditions.

As stated above, the gaze point of the target object may be analyzed by using images photographed by the active image acquisition device. In order that the analyzed gaze point of the target object is more accurate, the gaze point of the target object may further be analyzed in combination with images photographed by the inactive image acquisition device. Therefore, the active image acquisition device may be controlled to photograph the first image by using the first configuration, and the inactive image acquisition device may be controlled to photograph the second image by using the second configuration, such that the bandwidth required by the inactive image acquisition device to transmit the photographed image to the controller is relatively small, and smaller than the bandwidth required by the active image acquisition device to transmit the photographed image to the controller, and not all of the image acquisition devices transmit the images to the controller through larger bandwidths (for example, equal to the bandwidth required by the active image acquisition device to transmit the photographed image to the controller), thereby saving the bandwidth for transmitting the images photographed by the multiple image acquisition devices.

In order that the bandwidth required by the inactive image acquisition device to transmit the photographed image to the controller is relatively small, and smaller than the bandwidth required by the active image acquisition device to transmit the photographed image to the controller, in an exemplary implementation mode of the embodiment of the present disclosure, step S103 may be implemented by at least one of the following manners during specific implementation.

The active image acquisition device is controlled to photograph the first image by using a first frequency, the inactive image acquisition device is controlled to photograph the second image by using a second frequency, and the first frequency is greater than the second frequency.

In the embodiment of the present disclosure, specific values of the first frequency and the second frequency are not specifically limited, and the specific value of the first frequency and the specific value of the second frequency may be determined according to actual conditions. As an example, the first frequency may be 30 Hz, and the second frequency may be 6 Hz.

It may be interpreted that as the frequency of the inactive image acquisition device for photographing the image is relatively low, the bandwidth required by the inactive image acquisition device to transmit the photographed image is relatively small.

The active image acquisition device is controlled to photograph the first image by using a first image bit width, the inactive image acquisition device is controlled to photograph the second image by using a second image bit width, and the first image bit width is greater than the second image bit width.

It is to be noted that specific values of the first image bit width and the second image bit width are not specifically limited in the embodiment of the present disclosure, and the specific values of the first image bit width and the second image bit width may be determined according to actual conditions. As an example, the first image bit width may be 8 bits, and the second image bit width may be 4 bits.

It may be interpreted that as the frequency of the inactive image acquisition device for photographing the image is relatively low, the bandwidth required by the inactive image acquisition device to transmit the photographed image is relatively small.

The active image acquisition device is controlled to photograph the first image by using a first resolution, the inactive image acquisition device is controlled to photograph the second image by using a second resolution, and the first resolution is greater than the second resolution.

It is to be noted that specific values of the first resolution and the second resolution are not specifically limited in the embodiment of the present disclosure, and the specific values of the first resolution and the second resolution may be determined according to actual conditions. As an example, the first resolution may be 2000*1000, and the second resolution may be 500*250.

It may be interpreted that as the frequency of the inactive image acquisition device for photographing the image is relatively low, the bandwidth required by the inactive image acquisition device to transmit the photographed image is relatively small.

In order that the bandwidth required by the inactive image acquisition device to transmit the photographed image to the controller is relatively small, and smaller than the bandwidth required by the active image acquisition device to transmit the photographed image to the controller, in a exemplary implementation mode of the embodiment of the present disclosure, step S104 may be implemented by the following manners during specific implementation.

The first image compressed by the active image acquisition device at a first compression ratio and transmitted by the active image acquisition device is acquired, the second image compressed by the active image acquisition device at a second compression ratio and transmitted by the inactive image acquisition device is acquired, and the first compression ratio is smaller than the second compression ratio.

It is to be noted that specific values of the first compression ratio and the second compression ratio are not specifically limited. As an example, the first compression ratio may be a relatively small value such as 0, and the second compression ratio may be a value greater than the first compression ratio such as 2. That is, when transmitting the photographed image to the controller, the active image acquisition device may compress the image at a small compression ratio, or does not compress the image, so as to provide high image quality and accurately analyze the gaze point of the target object. However, when transmitting the photographed image to the controller, the inactive image acquisition device may compress the image at a high compression ratio, so as to reduce the image dimensions, thereby reducing the bandwidth required to transmit the image to the controller.

It may be interpreted that when the image acquisition devices photograph the images, the position of the target object may be subjected to change, for example, the target object moves towards a direction of the active image acquisition device. Therefore, based upon that the active image acquisition device photographs the image at the first frequency, and the inactive image acquisition device photographs the image at the second frequency, it is possible that the gaze point of the target object cannot be accurately analyzed.

As a result, in the embodiment of the present disclosure, the first frequency and the second frequency may further be adjusted, such that the gaze point of the target object may be accurately analyzed with the image photographed by the active image acquisition device and the image photographed by the inactive image acquisition device.

It is to be noted that the first frequency and the second frequency may be adjusted in a variety of implementation modes. Three exemplary implementation modes are described below.

In a first exemplary implementation mode, at least one of the first frequency and the second frequency is adjusted according to the relative positions between each of the multiple image acquisition devices and the target object.

It may be interpreted that the active image acquisition device is correspondingly provided with a first photographing region with a good photographing effect, and the image photographed in the first photographing region has a high definition. Therefore, at least one of the first frequency and the second frequency is adjusted according to the relative positions between each of the multiple image acquisition devices and the target object. During specific implementation, whether the target object is located in the first photographing region may be determined. When the target object is located in the first photographing region, the value of the second frequency is decreased. And when the target object is located out of the first photographing region, the value of the second frequency is increased.

It may be interpreted that when the target object is located in the first photographing region, it is indicated that the gaze point of the target object may be accurately analyzed based on the image photographed by the active image acquisition device. And at this time, the value of the second frequency may be decreased. When the target object is located out of the first photographing region, it is indicated that the gaze point of the target object may not be accurately analyzed based on the image photographed by the active image acquisition device. And at this time, the value of the second frequency may be increased. Therefore, the accuracy of analysis on the gaze point of the target object is improved in combination with the image photographed by the active image acquisition device and the image photographed by the inactive image acquisition device.

It may be interpreted that the inactive image acquisition device is correspondingly provided with a second photographing region with the good photographing effect, and the image photographed in the second photographing region has the high definition. Therefore, at least one of the first frequency and the second frequency is adjusted according to the relative positions between the multiple image acquisition devices and the target object. During specific implementation, whether the target object is located in the second photographing region may be determined; and when the target object is located in the second photographing region, the value of the second frequency is increased, and the value of the first frequency is decreased.

It may be interpreted that when the target object is located in the second photographing region, it is indicated that the gaze point of the target object may be accurately analyzed based on the image photographed by the inactive image acquisition device. And at this time, the value of the first frequency may be decreased, and correspondingly, the value of the second frequency may be increased.

In a second exemplary implementation mode, at least one of the first frequency and the second frequency may be adjusted according to a definition of the first image.

Specifically, when the definition of the image photographed by the active image acquisition device is greater than or equal to a definition threshold, the value of the second frequency may be decreased. And when the definition of the image photographed by the active image acquisition device is smaller than the definition threshold, the value of the second frequency may be increased.

It may be interpreted that when the definition of the image photographed by the active image acquisition device is greater than or equal to the definition threshold, it is indicated that the gaze point of the target object may be accurately analyzed based on the image photographed by the active image acquisition device. And at this time, the value of the second frequency may be decreased. When the definition of the image photographed by the active image acquisition device is smaller than the definition threshold, it is indicated that the gaze point of the target object may not be accurately analyzed based on the image photographed by the active image acquisition device. And at this time, the value of the second frequency may be increased. Therefore, the accuracy of analysis on the gaze point of the target object is improved in combination with the image photographed by the active image acquisition device and the image photographed by the inactive image acquisition device.

In the embodiment of the present disclosure, the definition threshold is not specifically limited, and the specific value of the definition threshold may be determined according to actual conditions.

Figure 2:
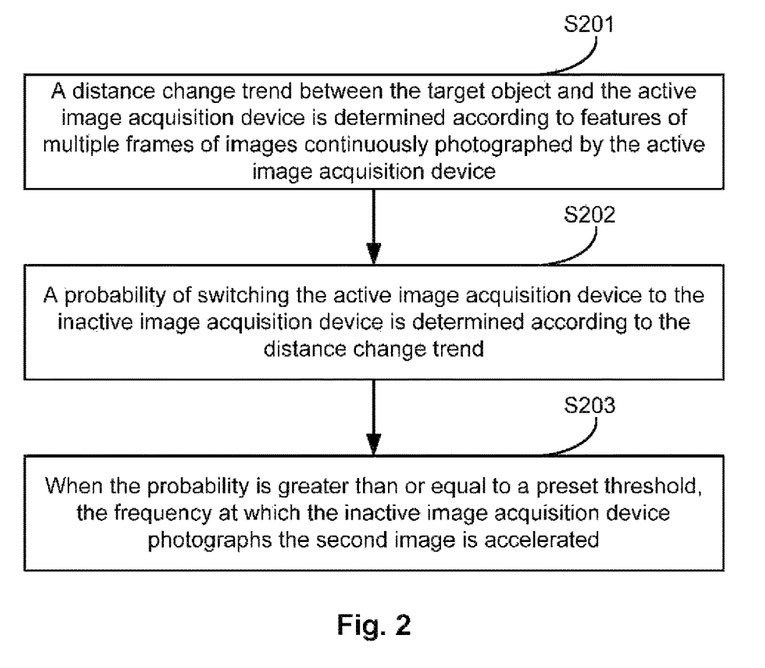
FIG. 2 is a flowchart of a method for adjusting a frequency of an image acquisition device to photograph an image according to an embodiment of the present disclosure.

In a third exemplary implementation mode, the following steps S201-S203 may be used for implementation.

In step S201, a distance change trend between the target object and the active image acquisition device is determined according to features of multiple frames of images continuously photographed by the active image acquisition device.

It may be interpreted that by using features of one frame of image photographed by the active image acquisition device, the distance between the target object and the active image acquisition device may be determined when the active image acquisition device acquires the frame of image. Therefore, the distance change trend between the target object and the active image acquisition device may be determined according to the features of the multiple frames of images continuously photographed by the active image acquisition device.

For example, according to features of three frames of images continuously photographed by the active image acquisition device, it is determined that the distance between the target object and the active image acquisition device is 45 cm when the active image acquisition device photographs the first frame of image, the distance between the target object and the active image acquisition device is 50 cm when the active image acquisition device photographs the second frame of image, and the distance between the target object and the active image acquisition device is 55 cm when the active image acquisition device photographs the third frame of image, and it may be determined that the change trend for the distance between the target object and the active image acquisition device is to become far gradually.

In step S202, a probability of switching the active image acquisition device to the inactive image acquisition device is determined according to the distance change trend.

It is to be noted that the probability of switching the active image acquisition device to the inactive image acquisition device in the embodiment of the present disclosure may be a probability that the target object moves away from a range where the active image acquisition device may photograph pictures clearly.

It may be interpreted that since the focusing position of the active image acquisition device may be determined, the range where the active image acquisition device may photograph the pictures clearly may be determined. Consequently, the probability that the target object moves away from the range where the active image acquisition device may photograph the pictures clearly may be determined according to the range where the active image acquisition device may photograph the pictures clearly as well as the distance change trend.

For example, when the distance between the target object and the active image acquisition device is smaller than or equal to 60 cm, the active image acquisition device may clearly photograph the image containing the target object, and the change trend of the distance between the target object and the active image acquisition device is to become far gradually. At this time, it may be determined that the probability of switching the active image acquisition device to the inactive image acquisition device is relatively large.

In step S203, when the probability is greater than or equal to a preset threshold, the frequency at which the inactive image acquisition device photographs the second image is accelerated.

It may be interpreted that if the probability is greater than or equal to the preset threshold, it is indicated that the gaze point of the target object cannot be accurately analyzed based on the image photographed by the active image acquisition device. At this time, the frequency at which the inactive image acquisition device photographs the image may be accelerated, and thus the gaze point of the target object is analyzed based on the image photographed by the active image acquisition device and the image photographed by the inactive image acquisition device.

It is to be noted that the preset threshold is not specifically limited in the embodiment of the present disclosure, and the specific value of the preset threshold may be determined according to actual conditions.

As stated above, the telemetry eye-tracking system includes multiple image acquisition devices; and in an exemplary implementation mode, the multiple image acquisition devices include a first image acquisition device and a second image acquisition device. In this case, the operation that "the position of the target object is acquired according to the images photographed by the multiple image acquisition devices" in the step A may be implemented through at least one of the following step C and step D.

In step C, a third image containing the target object photographed by the first image acquisition device is acquired, and a distance between the target object and the first image acquisition device is determined according to features of the third image.

It is to be noted that the distance between the target object and the first image acquisition device may be embodied by one of an interpupillary distance of the target object, a glint distance in eyes of the target object and an iris radius of the target object in the third image. Therefore, the distance between the target object and the first image acquisition device may be determined by extracting features associated with the interpupillary distance of the target object, or features associated with the glint distance in the eyes of the target object, or features associated with the iris radius of the target object in the third image.

In step D, a fourth image containing the target object photographed by the second image acquisition device is acquired, and a distance between the target object and the second image acquisition device is determined according to features of the fourth image.

The specific implementation mode of step D is similar to the specific implementation mode of step C, and the distance between the target object and the second image acquisition device may be determined by extracting the features associated with the interpupillary distance of the target object, or the features associated with the glint distance in the eyes of the target object, or the features associated with the iris radius of the target object in the third image. Relevant description parts may refer to the descriptions on step A, and are no longer elaborated.

Correspondingly, when the position of the target object is acquired by using at least one of C and D, the operation that "the active image acquisition device and the inactive image acquisition device in the multiple image acquisition devices are determined according to the relative positions between the multiple image acquisition devices and the target object" in step B may be implemented by at least one of the following step E and step F.

In step E, when the distance between the target object and the first image acquisition device is located in a first distance interval, the first image acquisition device is determined as the active image acquisition device, the second image acquisition device is determined as the inactive image acquisition device, and the first distance interval is determined according to a focusing position of the first image acquisition device.

It is to be noted that when the distance between the target object and the first image acquisition device is located in the first distance interval, it may be considered that the first image acquisition device may clearly photograph the image containing the target object. And at this time, the first image acquisition device may be determined as the active image acquisition device, and the second image acquisition device may be determined as the inactive image acquisition device. It may be interpreted that the range where the first image acquisition device may clearly photograph the image is associated with the focusing position of the first image acquisition device. Hence, in the embodiment of the present disclosure, the first distance interval may be determined according to the focusing position of the first image acquisition device.

In step F, when the distance between the target object and the first image acquisition device is located in a second distance interval, the first image acquisition device is determined as the inactive image acquisition device, the second image acquisition device is determined as the active image acquisition device, and the second distance interval is determined according to a focusing position of the second image acquisition device.

It is to be noted that when the distance between the target object and the second image acquisition device is located in the second distance interval, it may be considered that the second image acquisition device may clearly photograph the image containing the target object. And at this time, the second image acquisition device may be determined as the active image acquisition device, and the first image acquisition device may be determined as the inactive image acquisition device.

It may be interpreted that the range where the second image acquisition device may clearly photograph the image is associated with the focusing position of the second image acquisition device. Hence, in the embodiment of the present disclosure, the second distance interval may be determined according to the focusing position of the second image acquisition device.

Figure 3:
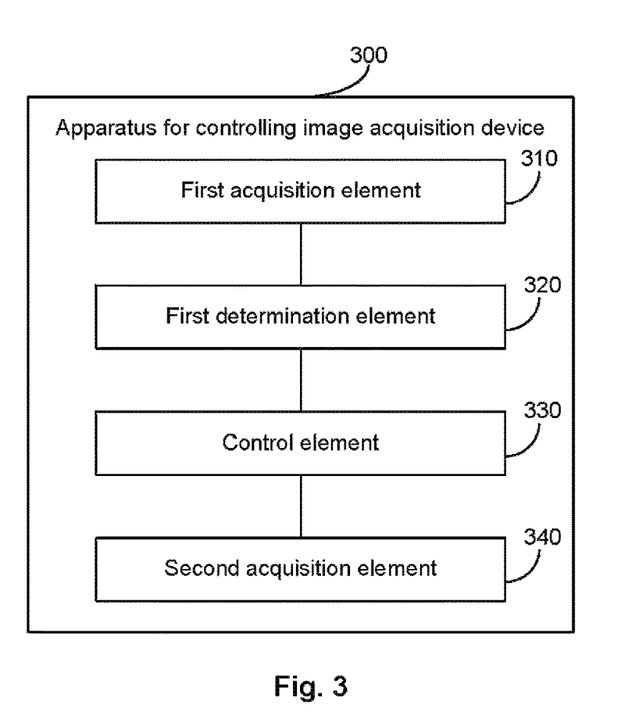
FIG. 3 is a structural block diagram of an apparatus for controlling an image acquisition device according to an embodiment of the present disclosure.

FIG. 3 is a structural block diagram of an apparatus for controlling an image acquisition device provided by an embodiment of the present disclosure. As shown in FIG. 3, the image acquisition device 300 provided by the embodiment of the present disclosure may include, for example, a first acquisition element 310, a first determination element 320, a control element 330 and a second acquisition element 340.

The first acquisition element 310 is configured to acquire multiple images photographed by multiple image acquisition devices.

The first determination element 320 is configured to determine an active image acquisition device and an inactive image acquisition device in the multiple image acquisition devices according to the multiple images.

The control element 330 is configured to control the active image acquisition device to photograph a first image by using a first configuration, and control the inactive image acquisition device to photograph a second image by using a second configuration.

The second acquisition element 340 is configured to acquire the first image transmitted by the active image acquisition device, and acquire the second image transmitted by the inactive image acquisition device.

A bandwidth required by the active image acquisition device to transmit the first image is greater than a bandwidth required by the inactive image acquisition device to transmit the second image.

Optionally, the first determination element 320 is configured to:

acquire a position of a target object according to the multiple images; and determine the active image acquisition device and the inactive image acquisition device according to relative positions between each of the multiple image acquisition devices and the target object.

Optionally, the first determination element 320 is configured to:

determine an image acquisition device without containing the target object in the multiple images as the inactive image acquisition device; and determine the active image acquisition device from image acquisition devices to be selected, and the image acquisition devices to be selected is remaining image acquisition devices except for the inactive image acquisition device in the multiple image acquisition devices.

Optionally, the control element 330 is configured to:

control the active image acquisition device to photograph the first image by using a first frequency, and control the inactive image acquisition device to photograph the second image by using a second frequency, the first frequency being greater than the second frequency;

control the active image acquisition device to photograph the first image by using a first image bit width, and control the inactive image acquisition device to photograph the second image by using a second image bit width, the first image bit width being greater than the second image bit width; and control the active image acquisition device to photograph the first image by using a first resolution, and control the inactive image acquisition device to photograph the second image by using a second resolution, the first resolution being greater than the second resolution.

Optionally, the second acquisition element 340 is configured to:

acquire the first image compressed by the active image acquisition device at a first compression ratio and transmitted by the active image acquisition device, and acquire the second image compressed by the active image acquisition device at a second compression ratio and transmitted by the inactive image acquisition device, the first compression ratio being smaller than the second compression ratio.

Optionally, the apparatus 300 may further include: a first adjustment element.

The first adjustment element is configured to adjust at least one of the first frequency and the second frequency according to the relative positions between each of the multiple image acquisition devices and the target object.

Optionally, the apparatus 300 may further include a second adjustment element.

The second adjustment element is configured to adjust at least one of the first frequency and the second frequency according to a definition of the first image.

Optionally, the apparatus 300 may further include a second determination element, a determination element and a frequency acceleration element.

The second determination element is configured to determine a distance change trend between the target object and the active image acquisition device according to features of multiple frames of images continuously photographed by the active image acquisition device.

The determination element is configured to determine, according to the distance change trend, a probability of switching the active image acquisition device to the inactive image acquisition device.

The frequency acceleration element is configured to accelerate, if the probability is greater than or equal to a preset threshold, a frequency at which the inactive image acquisition device photographs the second image.

Optionally, the multiple image acquisition devices include a first image acquisition device and a second image acquisition device.

The first determination element is further configured to execute at least one of the following operations.

The first determination element acquires a third image containing the target object photographed by the first image acquisition device and determine a distance between the target object and the first image acquisition device according to features of the third image.

The first determination element acquires a fourth image containing the target object photographed by the second image acquisition device and determine a distance between the target object and the second image acquisition device according to features of the fourth image.

Optionally, the first determination element is further configured to execute at least one of the following operations.

The first determination element determines, when the distance between the target object and the first image acquisition device is located in a first distance interval, the first image acquisition device as the active image acquisition device, and determine the second image acquisition device as the inactive image acquisition device, the first distance interval being determined according to a focusing position of the first image acquisition device.

The first determination element determines, when the distance between the target object and the first image acquisition device is located in a second distance interval, the first image acquisition device as the inactive image acquisition device, and determine the second image acquisition device as the active image acquisition device, the second distance interval being determined according to a focusing position of the second image acquisition device.

Optionally, a distance between any two image acquisition devices in the multiple image acquisition devices is smaller than a preset distance threshold; and the multiple image acquisition devices at least include two image acquisition devices with different focusing positions.

The apparatus 300 is an apparatus corresponding to the method provided by the method embodiment. Specific description on the apparatus 300 may refer to the description in the method embodiment, and is no longer elaborated herein.

Therefore, with the utilization of the apparatus for controlling the image acquisition device provided by the embodiment of the present disclosure, the active image acquisition device and the inactive image acquisition device in the multiple image acquisition devices may be determined, the active image acquisition device is controlled to photograph the first image by using the first configuration, and the inactive image acquisition device is controlled to photograph the second image by using the second configuration, such that the bandwidth required by the inactive image acquisition device to transmit the photographed image to the controller is relatively small, and smaller than the bandwidth required by the active image acquisition device to transmit the photographed image to the controller, and not all of the image acquisition devices transmit the images to the controller through larger bandwidths (for example, equal to the bandwidth required by the active image acquisition device to transmit the photographed image to the controller), thereby saving the bandwidth for transmitting the images photographed by the multiple image acquisition devices.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and embodiments are considered as being exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. The scope of the present disclosure is limited by the appended claims.

The above are exemplary embodiments of the present disclosure and are not intended to limit the present disclosure. Any modification, equivalent replacement, improvement and the like made within the spirit and principle of the present disclosure should be included in the scope of protection of the present disclosure.

What is claimed is:

1. A method for controlling an image acquisition device, comprising:
acquiring a plurality of images photographed by a plurality of image acquisition devices;
determining an active image acquisition device and an inactive image acquisition device in the plurality of image acquisition devices according to the plurality of images;
controlling the active image acquisition device to photograph a first image by using a first configuration, and controlling the inactive image acquisition device to photograph a second image by using a second configuration; and
acquiring the first image transmitted by the active image acquisition device, and acquiring the second image transmitted by the inactive image acquisition device;
wherein a bandwidth required by the active image acquisition device to transmit the first image is greater than a bandwidth required by the inactive image acquisition device to transmit the second image;
wherein acquiring the first image transmitted by the active image acquisition device, and acquiring the second image transmitted by the inactive image acquisition device comprises:
acquiring the first image compressed by the active image acquisition device at a first compression ratio and transmitted by the active image acquisition device, and acquiring the second image compressed by the active image acquisition device at a second compression ratio and transmitted by the inactive image acquisition device, the first compression ratio being smaller than the second compression ratio.

2. The method as claimed in claim 1, wherein determining the active image acquisition device and inactive image acquisition device in the plurality of image acquisition devices according to the plurality of images comprises:
acquiring a position of a target object according to the plurality of images; and
determining the active image acquisition device and the inactive image acquisition device according to relative positions between each of the plurality of image acquisition devices and the target object.

3. The method as claimed in claim 1, wherein determining the active image acquisition device and inactive image acquisition device in the plurality of image acquisition devices according to the plurality of images comprises:
determining an image acquisition device without containing the target object in the plurality of images as the inactive image acquisition device; and
determining the active image acquisition device from image acquisition devices to be selected, the image acquisition devices to be selected being remaining image acquisition devices except for the inactive image acquisition device in the plurality of image acquisition devices.

4. The method as claimed in claim 1, wherein controlling the active image acquisition device to photograph the first image by using the first configuration, and controlling the inactive image acquisition device to photograph the second image by using the second configuration comprises at least one of the followings:
controlling the active image acquisition device to photograph the first image by using a first frequency, and controlling the inactive image acquisition device to photograph the second image by using a second frequency, the first frequency being greater than the second frequency;
controlling the active image acquisition device to photograph the first image by using a first image bit width, and controlling the inactive image acquisition device to photograph the second image by using a second image bit width, the first image bit width being greater than the second image bit width; and
controlling the active image acquisition device to photograph the first image by using a first resolution, and controlling the inactive image acquisition device to photograph the second image by using a second resolution, the first resolution being greater than the second resolution.

5. The method as claimed in claim 4, further comprising:
adjusting at least one of the first frequency and the second frequency according to the relative positions between each of the plurality of image acquisition devices and the target object.

6. The method as claimed in claim 4, further comprising:
adjusting at least one of the first frequency and the second frequency according to a definition of the first image.

7. The method as claimed in claim 1, further comprising:
determining a distance change trend between the target object and the active image acquisition device according to features of a plurality of frames of images continuously photographed by the active image acquisition device;
determining, according to the distance change trend, a probability of switching the active image acquisition device to the inactive image acquisition device; and
when the probability is greater than or equal to a preset threshold, accelerating a frequency at which the inactive image acquisition device photographs the second image.

8. The method as claimed in claim 2, wherein the plurality of image acquisition devices comprise a first image acquisition device and a second image acquisition device; and
acquiring the position of the target object according to the plurality of images comprises at least one of the followings:
acquiring a third image containing the target object photographed by the first image acquisition device and determining a distance between the target object and the first image acquisition device according to features of the third image;
and,
acquiring a fourth image containing the target object photographed by the second image acquisition device and determining a distance between the target object and the second image acquisition device according to features of the fourth image.

9. The method as claimed in claim 8, wherein determining the active image acquisition device and the inactive image acquisition device according to the relative positions between each of the plurality of image acquisition devices and the target object comprises at least one of the followings:
when the distance between the target object and the first image acquisition device is located in a first distance interval, determining the first image acquisition device as the active image acquisition device, and determining the second image acquisition device as the inactive image acquisition device, the first distance interval being determined according to a focusing position of the first image acquisition device; and, when the distance between the target object and the first image acquisition device is located in a second distance interval, determining the first image acquisition device as the inactive image acquisition device, and determining the second image acquisition device as the active image acquisition device, the second distance interval being determined according to a focusing position of the second image acquisition device.

10. The method as claimed in claim 1, wherein a distance between any two image acquisition devices in the plurality of image acquisition devices is smaller than a preset distance threshold; and the plurality of image acquisition devices at least comprise two image acquisition devices with different focusing positions.

* * * * *